(12) United States Patent
Dörr et al.

(10) Patent No.: US 9,783,701 B2
(45) Date of Patent: Oct. 10, 2017

(54) AQUEOUS POLYURETHANE DISPERSION FOR WATERPROOF BREATHABLE COATINGS

(75) Inventors: Sebastian Dörr, Düsseldorf (DE); Hans Georg Grablowitz, Köln (DE); Sophie Viala, Köln (DE); Thomas Feller, Solingen (DE); Thomas Michaelis, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 14/344,416

(22) PCT Filed: Sep. 11, 2012

(86) PCT No.: PCT/EP2012/067727
§ 371 (c)(1),
(2), (4) Date: Mar. 12, 2014

(87) PCT Pub. No.: WO2013/037767
PCT Pub. Date: Mar. 21, 2013

(65) Prior Publication Data
US 2014/0342624 A1    Nov. 20, 2014

(30) Foreign Application Priority Data
Sep. 13, 2011  (EP) .................................... 11181002

(51) Int. Cl.
| | | |
|---|---|---|
| C09D 175/06 | (2006.01) | |
| C08G 18/66 | (2006.01) | |
| C08G 18/75 | (2006.01) | |
| C08G 18/08 | (2006.01) | |
| C09D 175/04 | (2006.01) | |
| C08G 18/42 | (2006.01) | |
| D06N 3/14 | (2006.01) | |

(52) U.S. Cl.
CPC ....... *C09D 175/06* (2013.01); *C08G 18/0828* (2013.01); *C08G 18/4238* (2013.01); *C08G 18/6637* (2013.01); *C08G 18/758* (2013.01); *C09D 175/04* (2013.01); *D06N 3/14* (2013.01); *D06N 3/146* (2013.01); *D06N 3/147* (2013.01); *D06N 2209/123* (2013.01); *D06N 2209/128* (2013.01); *Y10T 428/31551* (2015.04); *Y10T 428/31598* (2015.04); *Y10T 428/31605* (2015.04); *Y10T 442/20* (2015.04)

(58) Field of Classification Search
CPC .............. C09D 175/06; C08G 18/0828; C08G 18/4238; C08G 18/6637; C08G 18/758
See application file for complete search history.

(56) References Cited

U.S. PATENT DOCUMENTS

| | | | |
|---|---|---|---|
| 4,190,566 A | 2/1980 | Noll et al. | |
| 5,629,402 A * | 5/1997 | Pedain | ............... C08G 18/0804 427/389 |
| 5,700,867 A | 12/1997 | Ishiyama et al. | |
| 5,716,676 A * | 2/1998 | Schutze | ............... C08G 18/0804 427/323 |
| 5,747,582 A | 5/1998 | Schutze et al. | |
| 2003/0195293 A1 | 10/2003 | Lubnin et al. | |
| 2006/0128885 A1* | 6/2006 | Rische | ............... C08G 18/0823 524/589 |
| 2007/0219296 A1 | 9/2007 | Trinks et al. | |
| 2011/0275728 A1 | 11/2011 | Schonberger et al. | |

FOREIGN PATENT DOCUMENTS

| | | |
|---|---|---|
| DE | 102006012354 A1 | 9/2007 |
| EP | 1970391 A2 | 9/2008 |
| WO | WO-2006075144 A1 | 7/2006 |
| WO | WO-2010083953 A1 | 7/2010 |

OTHER PUBLICATIONS

International Search Report for PCT/EP2012/067727 mailed May 10, 2013.

\* cited by examiner

*Primary Examiner* — Michael L Leonard
(74) *Attorney, Agent, or Firm* — Drinker Biddle & Reath LLP

(57) ABSTRACT

An aqueous polyurethane dispersion comprises a polyurethane polymer obtainable by the reaction of an isocyanate-functional polyurethane prepolymer A) with an isocyanate-reactive component B), wherein the isocyanate-functional prepolymer A) is obtainable by the reaction of a mixture comprising: a polyol component comprising a polyester polyol obtainable by the reaction of a mixture comprising an aliphatic dicarboxylic acid and at least one diol selected from the group consisting of linear aliphatic diols and a branched aliphatic diols; and a polyisocyanate component comprising $\geq 50$ weight-%, based on the total weight of polyisocyanates, of dicyclohexylmethane diisocyanate. The isocyanate-reactive component B) comprises a compound comprising sulfonate groups which is employed in an amount of $\geq 3.5$ weight-% to $\leq 10$ weight-%, based on the total weight of the polyol component, the polyisocyanate component and the isocyanate-reactive component B). The invention also concerns the use of such an aqueous polyurethane dispersion for coatings, a method of manufacturing a coated substrate and to a coated substrate.

14 Claims, No Drawings

AQUEOUS POLYURETHANE DISPERSION FOR WATERPROOF BREATHABLE COATINGS

RELATED APPLICATIONS

This application is a national stage application (under 35 U.S.C. §371) of PCT/EP2012/067727, filed Sep. 11, 2012, which claims benefit of European Application No. 11181002.4, filed Sep. 13, 2011, which is incorporated by reference herein.

The present invention relates to an aqueous polyurethane dispersion comprising a polyurethane polymer obtainable by the reaction of an isocyanate-functional polyurethane prepolymer A) with an isocyanate-reactive component B), wherein the isocyanate-functional prepolymer A) is obtainable by the reaction of a mixture comprising: a polyol component comprising a polyester polyol obtainable by the reaction of a mixture comprising an aliphatic dicarboxylic acid and at least one diol selected from the group consisting of linear aliphatic diols and branched aliphatic diols; and a polyisocyanate component comprising ≥50 weight-%, based on the total weight of polyisocyanates, of dicyclohexylmethane diisocyanate. The invention also concerns the use of such an aqueous polyurethane dispersion for coatings, a method of manufacturing a coated substrate and to a coated substrate.

In recent years, many fabrics have been developed which the various manufacturers claim are both waterproof and water vapor permeable. These materials are commonly described as waterproof breathable fabrics (WBFs), and they normally incorporate a continuous polymer membrane. The membrane may be in the form of a thin coated layer applied directly to the fabric, or as a pre-cast film subsequently bonded to the fabric with an adhesive layer. The direct coatings may comprise one complete layer or more usually a series of different layers, for example, a base coat or tie coat directly attached to the fabric, one or more intermediate coats, and an outermost or top coat. The direct coating may therefore have the same polymer composition throughout, but more usually comprises a series of different polymer compositions applied by successive coating operations, in particular, the base coat and top coat usually have a substantially different polymer composition.

The polymers used in WBFs include poly(tetrafluoroethylene), polyester, polyamide and especially, polyurethane. The complete coatings, separate coated layers, pre-cast films and adhesives may be formed from microporous polymers or hydrophilic polymers, or various combinations thereof may be used in the manufacture of WBFs. A useful reference book for this technology including descriptions of manufacturing techniques and machinery is "New Materials Permeable to Water Vapour", Dr Harro Traubel, Springer-Verlag (Berlin), 1999.

The major use of WBFs is in the waterproof clothing area, although these materials are also used in footwear and industrial clothing as well as some other non-apparel applications. The water vapor permeability of the polymer membrane is sufficient to allow sensible and insensible perspiration to diffuse away from the body.

Micropores for coatings can be manufactured physically by applying a polymer solution to a substrate and contacting this film with a non-solvent for the polymer which is miscible with the polymer solvent. Evaporating liquids lead to microchannels for water vapor transport.

A chemical pathway to water vapor permeable films is based on hydrophilic components of the coating such as polyoxyalkylene units which facilitate the water vapor transport through the coating.

In this respect, U.S. Pat. No. 5,700,867 discloses an aqueous dispersion of an aqueous polyurethane having an ionic functional group, polyoxyethylene units and terminal hydrazine functional groups. The content of the ionic functional group is about 5 to about 180 milliequivalents per 100 g of the aqueous polyurethane, and content of the polyoxyethylene unit is about 20% by weight or less of a weight of the aqueous polyurethane. The aqueous dispersion is used for a composition for ink, coating or adhesive. Storage stability, water resistance, pigment dispersibility, and adhesion to various kinds of substrates, particularly non-polar substrates, of the aqueous dispersion and the composition are reported as excellent. However, no mention is made of water vapor permeability.

U.S. Pat. No. 4,190,566 relates to non-ionic, water-dispersible polyurethanes having a substantially linear molecular structure and lateral polyalkylene oxide polyether chains containing ethylene oxide units characterized in that from about 40 to 95% of the alkylene oxide units of the lateral polyalkylene oxide polyether chains consist of ethylene oxide units and from about 5 to 60% consist of propylene oxide, butylene oxide or styrene oxide, to aqueous dispersions of these non-ionic, water-dispersible polyurethanes and to processes for producing these non-ionic, water-dispersible polyurethanes. Here, too, no mention is made of water vapor permeability.

US 2003/0195293 A1 describes a breathable polyurethane having an upright moisture vapor transmission rate (MVTR) of more than about 500 gms/m$^2$/24 hr which comprises: (a) poly(alkylene oxide) side-chain units in an amount comprising about 12 wt. % to about 80 wt. % of said polyurethane, wherein (i) alkylene oxide groups in said poly(alkylene oxide) side-chain units have from 2 to 10 carbon atoms and are unsubstituted, substituted, or both unsubstituted and substituted, (ii) at least about 50 wt. % of said alkylene oxide groups are ethylene oxide, and (iii) said amount of said side-chain units is (i) at least about 30 wt. % when the molecular weight of said side-chain units is less than about 600 grams/mole, (ii) at least about 15 wt. % when the molecular weight of said side-chain units is from about 600 to about 1,000 grams/mole, and at least about 12 wt.; % when the molecular weight of said side-chain units is more than about 1,000 grams/mole, and (b) poly(ethylene oxide) main-chain units in an amount comprising less than about 25 wt. % of said polyurethane. Coatings and films for textiles and other articles and applications using such polyurethanes are reported to have excellent breathability, i.e., high moisture vapor transmission rates (MVTR).

WO 2006/075144 A1 concerns a poly(urethane-urea) comprising segments derived from (a) a diisocyanate or mixture of diisocyanates; (b) a polyether polyol comprising repeating units of general formula —[(CH$_2$)$_m$O]— wherein each m is the same or different and is 3 or 4, or a mixture of said polyether polyols; and (c) a diamine or mixture of diamines, wherein said polyether polyol segment(s) (b) make up at least 70% by weight of the dry poly(urethane-urea) and wherein the ether oxygen atoms of said polyether polyol segment(s) (b) make up at least 15% by weight of the dry poly(urethane-urea); and wherein said poly(urethane-urea) has an amine end group content of up to 0.2% by weight. These poly(urethane-urea)s can be manufactured and compounded to give one-component and two-component coating formulations, which can be used to produce materials with reported good barrier properties such as waterproof breathable fabrics, foul weather and protective clothing, and films for medical and other applications.

U.S. Pat. No. 5,629,402 describes coating compositions containing (A) a polyurethane system containing either a polyurethane containing ionic groups and polyethylene oxide units or a precursor thereof prepared from a blocked isocyanate prepolymer and a cross-linking agent and, optionally, (B) organic solvents. This patent further relates to the use of such coating compositions to prepare coatings that are permeable to water vapor.

Other examples include U.S. Pat. No. 5,716,676 and U.S. Pat. No. 5,747,582 which relate to coating compositions and to the use of coating compositions to prepare coatings having water vapor permeabilities of at least 2500 g/m$^2$ per day (DS 2109 TM1 method) containing (A) a polyurethane containing (1) 0.1 to 75 meq/100 g of ionic groups and (2) 11 to 50% by weight of —$(CH_2CH_2O)_n$— units (wherein n is 2 to 25) incorporated into the main chain prepared from reactive components comprising (I) one or more polyisocyanates, (II) one or more polyols having a number average molecular weight of 350 to 5000, with the proviso that if any such polyol is a sulfonated polyether diol having the formula group having 1 to 8 carbon atoms, m and n are 1 to 10, p is 0, 1, or 2, and M is ammonium or alkali metal cation, then an additional ethoxy-containing polyether polyol must also be present, and (III) one or more chain lengthening agents having a molecular weight of 32 to 349; and (B) 30 to 80% by weight, based on the sum of components (A) and (B), of an aqueous phase.

The use of polyoxyalkylene glycols and in particular polyethylene glycols as polyurethane components for breathable coatings has the disadvantage that the viscosities of the resultant polyurethane dispersions are rather high. This is undesirable form a processing viewpoint.

Furthermore, hydrophilic polyurethane polymer segments are more prone to hydrolysis, making breathable fabrics less laundry-proof.

The present invention therefore has the object of providing polyurethane dispersions which can be used for the production of waterproof and water vapor permeable coatings having an improved laundry-proofness.

In summary, the invention provides polyurethane dispersions in which the soft segments of the polyurethane polymer are based on certain aliphatic polyester polyols, the hard segments are based on a certain aliphatic polyisocyanate and the polymer contains a certain amount of an ionic chain extender.

Accordingly, the object has been solved by the present invention by an aqueous polyurethane dispersion comprising a polyurethane polymer obtainable by the reaction of an isocyanate-functional polyurethane prepolymer A) with an isocyanate-reactive component B), wherein the isocyanate-functional prepolymer A) is obtainable by the reaction of a mixture comprising:

a polyol component comprising a polyester polyol obtainable by the reaction of a mixture comprising at least one aliphatic dicarboxylic acid and at least one diol selected from the group consisting of linear aliphatic diols and branched aliphatic diols; and a polyisocyanate component comprising ≥50 weight-%, based on the total weight of polyisocyanates, of dicyclohexylmethane diisocyanate;

and wherein the isocyanate-reactive component B) comprises a compound comprising sulfonate groups which is employed in an amount of ≥3.5 weight-% to ≤10 weight-%, based on the total weight of the polyol component, the polyisocyanate component and the isocyanate-reactive component B).

It has surprisingly been found that dispersions according to the invention lead to coatings with a high water vapor permeability. At the same time, the coatings show an improved laundry-proofness due to the use of non-hydrophilic polyester polyols as soft segments of the polyurethane polymer.

The polyol component comprises a polyester polyol. It is possible that this polyester polyol is the sole polyol of the polyol component. Examples for aliphatic dicarboxylic acids include tetrahydrophthalic acid, hexahydrophthalic acid, cyclohexanedicarboxylic acid, adipic acid, azelaic acid, sebacic acid, glutaric acid, maleic acid, fumaric acid, itaconic acid, malonic acid, suberic acid, 2-methylsuccinic acid, 3,3-diethylglutaric acid and/or 2,2-dimethylsuccinic acid. The corresponding anhydrides can also be used as acid source. The aliphatic dicarboxylic acids may be used in the form of one or more of their corresponding diester derivatives, particularly their dimethanol or diethanol ester derivatives.

Examples for linear aliphatic diols include 1,2-ethanediol (i.e., ethylene glycol), 1,3-propanediol, 1,4-butanediol, 1,5-pentanediol, 1,6-hexanediol, 1,7-heptanediol, 1,8-octanediol, 1,9-nonanediol, 1,10-decanediol and 1,3-butanediol. Preferably, linear aliphatic diols are selected from the group consisting of 1,3- and 1,4-butanediol, 1,6-hexanediol and/or 1,8-octanediol.

Examples for branched aliphatic diols include neopentyl glycol, 1,2-propanediol, 2-methyl-1,2-propanediol, 2-methyl-1,3-propanediol, 1,2-butanediol, meso-2,3-butanediol, 2,3-dimethyl-2,3-butanediol (pinacol), 1,2-pentanediol, 2,3-pentanediol, 2,4-pentanediol, 1,4-pentanediol, 2,2,4-trimethyl-1,3-pentanediol, 1,3-hexanediol, 1,4-hexanediol, 1,5-hexanediol, 2,5-hexanediol, 2,5-dimethyl-2,5-hexanediol, 1,3-cyclobutanediol, 2,2,4,4-tetramethylcyclobutanediol, 1,2-cyclopentanediol, 1,3-cyclopentanediol, 1,3-dimethyl-1,3-cyclopentanediol, 1,2-cyclohexanediol, 1,3-cyclohexanediol, 1,4-cyclohexanediol and 1,4-dimethylolcyclohexane. Preferably, branched aliphatic diols are selected from the group consisting of neopentyl glycol, 2-methyl-1,3-propanediol and/or 2,2,4-trimethyl-1,3-pentanediol.

According to the invention the polyisocyanate component comprises ≥50 weight-%, preferably ≥80 weight-% and more preferred 100 weight-%, based on the total weight of polyisocyanates, of dicyclohexylmethane diisocyanate ($H_{12}$-MDI). In this respect, all isomers and isomer mixtures of $H_{12}$-MDI are within the scope of the present invention.

If employed, additional polyisocyanates may be the aromatic, araliphatic, aliphatic or cycloaliphatic polyisocyanates having an NCO functionality of 2 which are known per se to the person skilled in the art.

Examples of suitable polyisocyanates are 1,4-butylene diisocyanate, 1,6-hexamethylene diisocyanate (HDI), isophorone diisocyanate (IPDI), 2,2,4- and/or 2,4,4-trimethylhexamethylene diisocyanate, 1,4-cyclohexylene diisocyanate, 1,4-phenylene diisocyanate, 2,4- and/or 2,6-tolylene diisocyanate, 1,5-naphthylene diisocyanate, 2,2'- and/or 2,4'- and/or 4,4'-diphenylmethane diisocyanate, 1,3- and/or 1,4-bis(2-isocyanatoprop-2-yl)benzene (TMXDI), 1,3-bis(isocyanatomethyl)benzene (XDI), and alkyl 2,6-diisocyanatohexanoates (lysine diisocyanates) containing C1-C8-alkyl groups.

Besides the above-mentioned polyisocyanates, it is also possible to employ proportionately modified diisocyanates having a uretdione, isocyanurate, urethane, allophanate, biuret, iminooxadiazinedione and/or oxadiazinetrione structure and unmodified polyisocyanates containing more than 2 NCO groups per molecule, for example 4-isocyanatomethyloctane 1,8-diisocyanate (nonane triisocyanate) or triphenylmethane 4,4',4''-triisocyanate.

Preferably polyisocyanates or polyisocyanate mixtures of the above-mentioned type contain exclusively aliphatically and/or cycloaliphatically bonded isocyanate groups and have an average NCO functionality of the mixture of 2 to 4, preferably 2 to 2.6 and particularly preferred 2 to 2.4.

Furthermore, the isocyanate-reactive component B) comprises an isocyanate-reactive compound comprising sulfonate groups. Examples for suitable compounds are mono- and diaminosulfonic acids and salts thereof. Examples of anionic or potentially anionic hydrophilizing agents of this type are 2-(2-aminoethylamino)-ethanesulfonic acid, ethylenediaminepropyl- or -butylsulfonic acid, 1,2- or 1,3-propylenediamine-β-ethylsulfonic acid. Furthermore, cyclohexylaminopropanesulfonic acid (CAPA), which is known from WO 01/88006 A1, can be used as an anionic or potentially anionic hydrophilizing agent.

The compound comprising sulfonate groups is preferably employed in an amount of ≥3.5 weight-% to ≤8 weight-%, based on the total weight of the polyol component, the polyisocyanate component and the isocyanate-reactive component B). The compound comprising sulfonate groups is more preferably employed in an amount of ≥3.5 weight-% to ≤6 weight-%, based on the total weight of the polyol component, the polyisocyanate component and the isocyanate-reactive component B).

For the purposes of this invention, water which may be used as a solvent in particular for the isocyanate-reactive component B) is not regarded as being part of this component B).

The preparation of the polyurethane dispersions can be carried out in one or more steps in a homogeneous or multistep reaction, some in the disperse phase. After complete or partial polyaddition a dispersion, emulsification or dissolution step is carried out. If desired, a further polyaddition or modification in the disperse phase is subsequently carried out.

All processes known from the prior art, such as, for example, the prepolymer mixing process, acetone process or melt dispersal process, can be used here. The acetone process is preferably used.

For preparation by the acetone process, the polyol component and the polyisocyanate component are usually initially introduced for the preparation of an isocyanate-functional polyurethane prepolymer and optionally diluted with a solvent which is miscible with water, but inert to isocyanate groups and heated to temperatures in the range from 50 to 120° C. In order to accelerate the isocyanate addition reaction, the catalysts known in polyurethane chemistry can be employed.

Suitable solvents are the conventional aliphatic, keto-functional solvents, such as acetone, 2-butanone, which can be added not only at the beginning of the preparation, but, if desired, can also partly be added later. Preference is given to acetone and 2-butanone.

Other solvents, such as xylene, toluene, cyclohexane, butyl acetate, methoxypropyl acetate, N-methylpyrrolidone, N-ethylpyrrolidone, solvents containing ether or ester units, may additionally be employed and distilled off in full or part or, in the case of N-methylpyrrolidone, N-ethylpyrrolidone, remain completely in the dispersion. However, other solvents apart from the conventional aliphatic, keto-functional solvents are preferably not used.

In the preparation of the polyurethane prepolymer from the molar ratio of isocyanate groups to isocyanate-reactive groups is generally 1.05 to 3.5, preferably 1.2 to 3.0, particularly preferably 1.3 to 2.5.

The conversion into the prepolymer is carried out in part or full, but preferably in full. Thus, polyurethane prepolymers which contain free isocyanate groups are obtained in the solid state or in solution.

It is possible to add a neutralization step, if desired. In the neutralization step for the partial or complete conversion of potentially anionic groups into anionic groups, bases, such as tertiary amines, for example trialkylamines having 1 to 12 C atoms, preferably 1 to 6 C atoms, particularly preferably 2 to 3 C atoms, in each alkyl radical or alkali metal bases, such as the corresponding hydroxides, are employed.

Examples thereof are trimethylamine, triethylamine, methyldiethylamine, tripropylamine, N-methylmorpholine, methyldiisopropylamine, ethyldiisopropylamine and diisopropylethylamine. The alkyl radicals may also carry, for example, hydroxyl groups, as in the case of the dialkylmonoalkanolamines, alkyldialkanolamines and trialkanolamines Neutralizers which can be employed, if desired, are also inorganic bases, such as aqueous ammonia solution or sodium hydroxide or potassium hydroxide.

Preference is given to ammonia, triethylamine, triethanolamine, dimethylethanolamine or diisopropylethylamine, as well as sodium hydroxide and potassium hydroxide, particularly preferably sodium hydroxide and potassium hydroxide.

The molar amount of the bases is 50 to 125 mol %, preferably between 70 and 100 mol %, of the molar amount of the acid groups to be neutralized. The neutralization can also be carried out simultaneously with the dispersion if the dispersion water already comprises the neutralizer.

In a further process step, the resultant prepolymer is subsequently dissolved, if this has not already taken place or has only taken place in part, with the aid of aliphatic ketones, such as acetone or 2-butanone.

In a chain extension step, $NH_2$- and/or NH-functional components are reacted in part or full with the remaining isocyanate groups of the prepolymer. The chain extension/termination is preferably carried out before the dispersion in water.

As the partial or complete chain extension is carried out using anionic or potentially anionic hydrophilizing agents containing $NH_2$ or NH groups, the chain extension of the prepolymers is preferably carried out before the dispersion.

The dispersion is preferably carried out after the chain extension. To this end, the dissolved and chain-extended polyurethane polymer is either introduced into the dispersion water, optionally with high shear, such as, for example, vigorous stirring, or conversely the dispersion water is stirred into the chain-extended polyurethane polymer solutions. The water is preferably added to the dissolved chain-extended polyurethane polymer.

The solvent still present in the dispersions after the dispersion step is usually subsequently removed by distillation. Removal during the dispersion is likewise possible.

The residual content of organic solvents in the polyurethane dispersions is typically less than 1.0% by weight, based on the entire dispersion.

The pH of the polyurethane dispersions is typically less than 9.0, preferably less than 8.5, particularly preferably less than 8.0 and very particularly preferably 6.0 to 7.5. The solids content of the polyurethane dispersions is 40 to 70% by weight, preferably 50 to 65% by weight, particularly preferably 55 to 65% by weight.

The present invention will be described with reference to further aspects and embodiments. They may be combined freely unless the context clearly indicates otherwise.

In one embodiment of the dispersion the polyester polyol has a number-average molecular weight of ≥1000 g/mol to ≤2000 g/mol. The number-average molecular weight may be determined using gel permeation chromatography against polystyrene standards. A preferred range is ≥1500 g/mol to ≤2000 g/mol. It is further preferred that the polyester polyol has an OH number (DIN 53240 part 2) is in the range of ≥50 mg KOH/g to ≤80 mg KOH/g.

In another embodiment of the dispersion, the reaction mixture from which the polyester polyol is obtainable by reacting a mixture comprising at least one aliphatic dicarboxylic acid, at least one linear aliphatic diol and at least one branched aliphatic diol.

In another embodiment of the dispersion, in the reaction mixture from which the polyester polyol is obtainable the aliphatic dicarboxylic acid is adipic acid, the linear aliphatic diol is hexane diol (preferably hexane-1,6-diol) and the branched aliphatic diol is neopentyl glycol. Preferably, the molar amount of hexane diol is greater than the molar amount of neopentyl glycol. For example, the molar ratio of hexane diol to neopentyl glycol may be in a range of ≥1.5:1 to ≤2.5:1.

In another embodiment of the dispersion the reaction mixture from which the polyester polyol is obtainable further comprises a polytetramethylene glycol polyol and/or a polycarbonate polyol. With respect to the polytetramethylene glycol polyol, preferred number-average molecular weights are in the range of ≥500 g/mol to ≤2000 g/mol and preferred OH numbers (DIN 53240 part 2) are in a range of 50≥mg KOH/g to ≤150 mg KOH/g.

Regarding the polycarbonate polyol, hydroxyl-containing polycarbonates, preferably polycarbonate diols, having number average molecular weights of 400 to 8000 g/mol, preferably 600 to 3000 g/mol, can be employed. These are obtainable by reaction of carbonic acid derivatives, such as diphenyl carbonate, dimethyl carbonate or phosgene, with polyols, preferably diols. Examples of diols of this type are ethylene glycol, 1,2- and 1,3-propanediol, 1,3- and 1,4-butanediol, 1,6-hexanediol, 1,8-octanediol, neopentyl glycol, 1,4-bishydroxymethylcyclohexane, 2-methyl-1,3-propanediol, 2,2,4-trimethyl-1,3-pentanediol, dipropylene glycol, polypropylene glycols, dibutylene glycol, polybutylene glycols, bisphenol A and lactone-modified diols of the above-mentioned type.

The polycarbonate diol preferably comprises 40 to 100% by weight of hexanediol, preferably 1,6-hexanediol, and/or hexanediol derivatives. Hexanediol derivatives of this type are based on hexanediol and, besides terminal OH groups, contain ester or ether groups. Derivatives of this type are obtainable by reaction of hexanediol with excess caprolactone or by etherification of hexanediol with itself to give di- or trihexylene glycol.

In another embodiment of the dispersion the polyisocyanate component comprises ≥99 weight-% to ≤100 weight-%, based on the total weight of polyisocyanates, of dicyclohexylmethane diisocyanate. Disregarding impurities, it is hence preferred that $H_{12}$-MDI is the only polyisocyanate component.

In another embodiment of the dispersion the isocyanate-reactive component B) comprises 2-[(2-aminoethyl)amino]ethanesulfonic acid and/or salts thereof. Most preferred is the sodium salt (AAS salt) which may be employed in substance or as an aqueous solution.

In another embodiment of the dispersion the isocyanate-reactive component B) further comprises a polyamine chain extender. These are preferably aliphatic or cycloaliphatic diamines, although it is also possible, if needed, to use trifunctional polyamines or polyfunctional polyamines in order to achieve specific properties. In general, it is possible to use polyamines containing additional functional groups, such as, for example, OH groups. Examples of suitable aliphatic polyamines are ethylenediamine, 1,2- and 1,3-propylenediamine, 1,4-tetramethylenediamine, 1,6-hexamethylenediamine, the isomer mixture of 2,2,4- and 2,4,4-trimethylhexamethylenediamine, 2-methylpentamethylenediamine and diethylenetriamine Preferred amounts of the polyamine chain extender are ≥5 weight-% to ≤15 weight-%, based on the total weight of the isocyanate-reactive component B).

In addition, compounds which, besides a primary amino group, also contain secondary amino groups or, besides an amino group (primary or secondary), also contain OH groups can also be added. Examples thereof are primary/secondary amines, such as diethanolamine, 3-amino-1-methylaminopropane, 3-amino-1-ethylaminopropane, 3-amino-1-cyclohexylaminopropane, 3-amino-1-methylaminobutane, and alkanolamines, such as N-aminoethylethanolamine, ethanolamine, 3-aminopropanol, and neopentanolamine Furthermore, monofunctional isocyanate-reactive amino compounds, such as, for example, methylamine, ethylamine, propylamine, butylamine, octylamine, laurylamine, stearylamine, isononyloxypropylamine, dimethylamine, diethylamine, dipropylamine, dibutylamine, N-methylaminopropylamine, diethyl(methyl)aminopropylamine, morpholine, piperidine, or suitable substituted derivatives thereof, amidoamines made from diprimary amines and monocarboxylic acids, monoketimes of diprimary amines, primary/tertiary amines, such as N,N-dimethylaminopropylamine, can also be added.

The present invention is further concerned with the use of an aqueous polyurethane dispersion according to the invention for the production of water vapor-permeable coatings. In particular, water vapor-permeable coatings are to be understood as coatings having a water vapor transmission rate (WVTR) of a wet film of ≥10000 g/m²/d according to the following protocol: a wet film of 150 μm thickness is applied onto a release paper. The film is then dried at 50° C. for 10 minutes and at 150° C. for 3 minutes. WVTR is then measured according to the publication DS 2109 TM1 of the British Textile Technology Group, Manchester, GB.

A further aspect of the present invention is a method of manufacturing a coated substrate, comprising the steps of providing a substrate and coating the substrate with an aqueous polyurethane dispersion according to the invention. Any of the various spraying methods, such as air pressure spraying, airless spraying or electrostatic spraying methods may be used. The dispersion can, however, also be applied by other processes, for example by brushing, rolling or knife coating.

In one embodiment, the method further comprises the step of drying the aqueous polyurethane dispersion. This leads to the formation of a polyurethane film on the substrate. The drying can be performed stepwise by first drying at a temperature below 100° C. and then above 100° C.

In another embodiment of the method the substrate is selected from the group consisting of textiles, metal surfaces, glass surfaces, ceramic surfaces, concrete surfaces, stone surfaces, leather surfaces and synthetic polymer surfaces. Particularly preferred are textiles in order to manufacture waterproof breathable fabrics. Examples for textiles include wool textiles, cotton textiles and synthetic (polymer) textiles.

The present invention is also directed towards a coated substrate comprising a coating which comprises an aqueous or dried polyurethane dispersion according to the invention. In case of a dried dispersion a polyurethane film is formed on the substrate. The film may be laminated onto the substrate or adhere to the substrate on accord of its inherent properties.

In one embodiment of the coated substrate the substrate is selected from the group consisting of textiles, metal surfaces, glass surfaces, ceramic surfaces, concrete surfaces, stone surfaces, leather surfaces and synthetic polymer surfaces. Particularly preferred are textiles so as to obtain waterproof breathable fabrics. Examples for textiles include wool textiles, cotton textiles and synthetic (polymer) textiles.

In another embodiment of the coated substrate the coating has a water vapor transmission rate of $\geq 10000$ g/m$^2$/d to $\leq 25000$ g/m$^2$/d. The water vapor transmission rate (WVTR) can be determined according to the following protocol: a wet film of 150 μm thickness is applied onto a release paper. The film is then dried at 50° C. for 10 minutes and at 150° C. for 3 minutes. WVTR is then measured according to the publication DS 2109 TM1 of the British Textile Technology Group, Manchester, GB.

EXAMPLES

The present invention is illustrated by reference to examples, although these are not to be understood as being limiting. Unless stated otherwise, all of the quantitative data, fractions and percentages are based on the weight and the total amount or on the total weight of the compositions. Unless noted otherwise, all of the analytical measurements refer to measurements at temperatures of 23° C.

The solids or solid-body contents were determined by heating a weighed sample at 125° C. to constant weight. At constant weight, the solid-body content is calculated by reweighing the sample.

Unless expressly mentioned otherwise, NCO contents were determined volumetrically in accordance with DIN-EN ISO 11909. The control on free NCO groups was carried out by means of IR spectroscopy (band at 2260 cm$^{-1}$)

The stated viscosities were determined by means of rotary viscometry in accordance with DIN 53019 at 23° C. using a rotary viscometer from Anton Paar Germany GmbH, Ostfildern, Germany.

The average particle sizes (the number-average is given) of the polyurethane dispersions were determined following dilution with deionized water by means of laser correlation spectroscopy (instrument: Malvern Zetasizer 1000, Malver Inst. Limited).

Glossary

Diaminosulfonate: NH$_2$—CH$_2$CH$_2$—NH—CH$_2$CH$_2$—SO$_3$Na (sodium 2-[(2-aminoethyl)amino]-ethanesulfonate, 45% strength in water); amounts given in the examples relate to this 45 weight-% solution in water Desmophen® 2020/C2200: polycarbonate polyol, OH number 56 mg of KOH/g, number-average molecular weight 2000 g/mol (Bayer MaterialScience AG, Leverkusen, Germany)

PolyTHF® 2000: polytetramethylene glycol polyol, OH number 56 mg of KOH/g, number-average molecular weight 2000 g/mol (BASF AG, Ludwigshafen, Germany)

PolyTHF® 1000: polytetramethylene glycol polyol, OH number 112 mg of KOH/g, number-average molecular weight 1000 g/mol (BASF AG, Ludwigshafen, Germany)

Polyether LB 25: monofunctional polyether based on ethylene oxide/propylene oxide of number-average molecular weight 2250 g/mol, OH number 25 mg of KOH/g (Bayer MaterialScience AG, Leverkusen, Germany)

Desmodur® W: dicyclohexylmethane diisocyanate (H$_{12}$-MDI)

Example 1 (Comparative Example)

987.0 g of PolyTHF® 2000, 375.4 g of PolyTHF® 1000, 761.3 g of Desmophen® C2200 and 44.3 g of polyether LB 25 were heated to 70° C. in a standard stirring apparatus. Then, a mixture of 237.0 g of hexamethylene diisocyanate and 313.2 g of isophorone diisocyanate was added and the mixture was stirred at 120° C. until the theoretical NCO value was reached. The finished prepolymer was dissolved with 4830 g of acetone and in so doing cooled to 50° C., and then a solution of 25.1 g of ethylenediamine, 116.5 g of isophoronediamine, 61.7 g of diaminosulfonate and 1030 g of water was metered in. The afterstirring time was 10 min. The mixture was then dispersed by adding 1250 g of water. The solvent was removed by distillation in vacuo.

The resulting white dispersion had the following properties:

Solids content: 61% Particle size (LCS): 312 nm
Viscosity (viscometer, 23° C.): 241 mPas
pH (23° C.): 7.15

Example 2 (Comparative Example)

450 g of PolyTHF® 1000 and 2100 g of PolyTHF® 2000 were heated to 70° C. Then, a mixture of 225.8 g of hexamethylene diisocyanate and 298.4 g of isophorone diisocyanate was added and the mixture was stirred at 100-115° C. until the actual NCO value had dropped below the theoretical NCO value. The finished prepolymer was dissolved with 5460 g of acetone at 50° C. and then a solution of 29.5 g of ethylenediamine, 143.2 g of diaminosulfonate and 610 g of water was metered in. The afterstirring time was 15 min. The mixture was then dispersed by adding 1880 g of water. The solvent was removed by distillation in vacuo and a storage-stable dispersion was obtained.

Solids content: 56%
Particle size (LCS): 276 nm Viscosity: 1000 mPas

Example 3 (Comparative Example)

1649.0 g of a polyester of adipic acid, hexanediol and neopentyl glycol with a number-average molecular weight of 1700 g/mol were heated to 65° C. Then, 291.7 g of hexamethylene diisocyanate were added and the mixture was stirred at 100-115° C. until the actual NCO value had dropped below the theoretical NCO value. The finished prepolymer was dissolved with 3450 g of acetone at 50° C. and then a solution of 16.8 g of ethylenediamine, 109.7 g of diaminosulfonate and 425 g of water was metered in. The afterstirring time was 15 min. The mixture was then dispersed by adding 1880 g of water. The solvent was removed by distillation in vacuo and a storage-stable dispersion was obtained.

Solids content: 42%
Particle size (LCS): 168 nm
Viscosity: 425 mPas
pH: 7.07

Example 4 (Comparative Example)

340 g of a polyester of adipic acid, hexanediol and neopentyl glycol with a number-average molecular weight of 1700 g/mol were heated to 65° C. Then, 60.1 g of hexamethylene diisocyanate were added and the mixture was stirred at 105° C. until the actual NCO value had dropped below the theoretical NCO value. The finished prepolymer was dissolved with 711 g of acetone at 50° C. and then a solution of 2.1 g of ethylenediamine, 32.4 g of diaminosulfonate and 104.3 g of water was metered in. The afterstirring time was 15 min. The mixture was then dispersed by adding 1880 g of water. The solvent was removed by distillation in vacuo and a storage-stable dispersion was obtained.
Solids content: 40%
Particle size (LCS): 198 nm
Viscosity: 700 mPas
pH: 6.31

Example 5 (Comparative Example)

340 g of a polyester of adipic acid, hexanediol and neopentyl glycol with a number-average molecular weight of 1700 g/mol were heated to 65° C. Then, 60.1 g of hexamethylene diisocyanate were added and the mixture was stirred at 105° C. until the actual NCO value had dropped below the theoretical NCO value. The finished prepolymer was dissolved with 711 g of acetone at 50° C. and then a solution of 46.9 g of diaminosulfonate and 129 g of water was metered in. The afterstirring time was 15 min. The mixture was then dispersed by adding 477 g of water. The solvent was removed by distillation in vacuo and a storage-stable dispersion was obtained.
Solids content: 33%
Particle size (LCS): 168 nm
Viscosity: 410 mPas
pH: 7.3

Example 6 (Comparative Example)

318.8 g of a polyester of adipic acid, hexanediol and neopentyl glycol with a number-average molecular weight of 1700 g/mol were heated to 65° C. Then, 74.5 g of isophorone diisocyanate were added and the mixture was stirred at 125° C. until the actual NCO value had dropped below the theoretical NCO value. The finished prepolymer was dissolved with 700 g of acetone at 50° C. and then a solution of 44.0 g of diaminosulfonate and 121 g of water was metered in. The afterstirring time was 15 min. The mixture was then dispersed by adding 470 g of water. The solvent was removed by distillation in vacuo and a storage-stable dispersion was obtained.
Solids content: 29%
Particle size (LCS): 29 nm
Viscosity: 450 mPas
pH: 6.9

Example 7 (Comparative Example)

318.8 g of a polyester of adipic acid, hexanediol and neopentyl glycol with a number-average molecular weight of 1700 g/mol were heated to 65° C. Then, 87.9 g of Desmodur® W were added and the mixture was stirred at 125° C. until the actual NCO value had dropped below the theoretical NCO value. The finished prepolymer was dissolved with 720 g of acetone at 50° C. and then a solution of 20.6 g of diaminosulfonate, 4.1 g of ethylene diamine and 87 g of water was metered in. The afterstirring time was 15 min. The mixture was then dispersed by adding 520 g of water. The solvent was removed by distillation in vacuo and a storage-stable dispersion was obtained.
Solids content: 40.2%
Particle size (LCS): 172 nm
Viscosity: 23 mPas
pH: 8.7

Example 8

318.8 g of a polyester of adipic acid, hexanediol and neopentyl glycol with a number-average molecular weight of 1700 g/mol were heated to 65° C. Then, 87.9 g of Desmodur® W were added and the mixture was stirred at 125° C. until the actual NCO value had dropped below the theoretical NCO value. The finished prepolymer was dissolved with 720 g of acetone at 50° C. and then a solution of 32.9 g of diaminosulfonate, 1.6 g of ethylene diamine and 102 g of water was metered in. The afterstirring time was 15 min. The mixture was then dispersed by adding 520 g of water. The solvent was removed by distillation in vacuo and a storage-stable dispersion was obtained.
Solids content: 40.5%
Particle size (LCS): 148 nm
Viscosity: 30 mPas
pH: 7.3

Example 9

318.8 g of a polyester of adipic acid, hexanediol and neopentyl glycol with a number-average molecular weight of 1700 g/mol were heated to 65° C. Then, 87.9 g of Desmodur® W were added and the mixture was stirred at 125° C. until the actual NCO value had dropped below the theoretical NCO value. The finished prepolymer was dissolved with 720 g of acetone at 50° C. and then a solution of 44.0 g of diaminosulfonate and 121 g of water was metered in. The afterstirring time was 15 min. The mixture was then dispersed by adding 500 g of water. The solvent was removed by distillation in vacuo and a storage-stable dispersion was obtained.
Solids content: 40.0%
Particle size (LCS): 215 nm
Viscosity: 48 mPas
pH: 9.0

Example 10

318.8 g of a polyester of adipic acid, hexanediol and neopentyl glycol with a number-average molecular weight of 1700 g/mol were heated to 65° C. Then, 87.9 g of Desmodur® W were added and the mixture was stirred at 125° C. until the actual NCO value had dropped below the theoretical NCO value. The finished prepolymer was dissolved with 720 g of acetone at 50° C. and then a solution of 41.8 g of diaminosulfonate, 1.5 g of ethylene diamine and 127 g of water was metered in. The afterstirring time was 15 min. The mixture was then dispersed by adding 480 g of water. The solvent was removed by distillation in vacuo and a storage-stable dispersion was obtained.

Solids content: 39.4%
Particle size (LCS): 149 nm
Viscosity: 108 mPas
pH: 8.9

Example 11

148.8 g of a polyester of adipic acid, hexanediol and neopentyl glycol with a number-average molecular weight of 1700 g/mol and 175.0 g of Desmophen® C 2200 were heated to 65° C. Then, 82.1 g of Desmodur® W were added and the mixture was stirred at 125° C. until the actual NCO value had dropped below the theoretical NCO value. The finished prepolymer was dissolved with 720 g of acetone at 50° C. and then a solution of 41.1 g of diaminosulfonate and 113 g of water was metered in. The afterstirring time was 15 min. The mixture was then dispersed by adding 500 g of water. The solvent was removed by distillation in vacuo and a storage-stable dispersion was obtained.

Solids content: 40.9%
Particle size (LCS): 182 nm
Viscosity: <50 mPas
pH: 8.5

Example 12 (Water Vapor Transmission Rate (WVTR) Testing)

In a film casting instrument comprising two polished rolls, which was set to a precise distance, a release paper was inserted in front of the rear roll. The distance between the paper and the front roll was adjusted by means of a feeler gauge. This distance corresponds to the (wet) film thickness of the resulting coating, and was adjusted to the desired deposition for each coat. Coating could also be performed consecutively in several coats.

The individual coats were applied by pouring the products (set to a viscosity of 4500 mPa s by addition of Borchi Gel ALA, Borchers, Langenfeld, Del.) onto the gap between the paper and the front roll and pulling the release paper vertically downwards, whereby the corresponding film was formed on the paper. If several coats were to be applied, each individual coat was dried and the paper inserted again.

In order to determine the water vapor transmission rate (WVTR), a wet film of 150 μm was applied onto a release paper of the type VEZ matte. The film was dried at 50° C. for 10 minutes and at 150° C. for 3 minutes. WVTR was measured according to the publication DS 2109 TM1 of the British Textile Technology Group, Manchester, GB. The results are summarized in the following table.

| Film based on dispersion of example no. | WVTR [g/m$^2$/d] |
|---|---|
| 1 (comparative) | 2280 |
| 2 (comparative) | 3750 |
| 3 (comparative) | 2170 |
| 4 (comparative) | 3060 |
| 5 (comparative) | 3100 |
| 6 (comparative) | 2300 |
| 7 (comparative) | 2800 |
| 8 | 16800 |
| 9 | 22900 |
| 10 | 19800 |
| 11 | 21300 |

Example 13: Hydrostatic Pressure Test

A film with a strength of 37.4 g/cm$^2$ was prepared from example 8 according to DIN 53886. Measurement of the hydrostatic pressure test (ISO 811:1981) was done according to DIN EN 20811:1992 at 20° C. The result was that no leakage could be detected at hydrostatic pressures of 6000 mm.

The invention claimed is:

1. An aqueous polyurethane dispersion comprising a polyurethane polymer obtained by the reaction of an isocyanate-functional polyurethane prepolymer A) with an isocyanate-reactive component B),
wherein
the isocyanate-functional prepolymer A) is obtained by the reaction of a mixture comprising:
a polyol component comprising a polyester polyol obtained by the reaction of a mixture comprising adipic acid, 1,6-hexanediol and neopentyl glycol, wherein the molar ratio of 1,6 hexane diol to neopentyl glycol is in a range of ≥1.5:1 to ≤2.5:1; and
a polyisocyanate component comprising ≥99 weight-% to ≤100 weight-%, based on the total weight of polyisocyanates, of dicyclohexylmethane diisocyanate;
and wherein the isocyanate-reactive component B) comprises 2-[(2-aminoethyl)amino]ethanesulfonic acid and/or salts thereof, in an amount of ≥3.5 weight-% to ≤6 weight-%, based on the total weight of the polyol component, the polyisocyanate component and the isocyanate-reactive component B),
and wherein the dispersion applied as a coating exhibits a water vapor transmission rate of ≥16800 g/m$^2$/d to ≤22900 g/m$^2$/d.

2. The dispersion according to claim 1, wherein the polyester polyol has a number-average molecular weight of ≥1000 g/mol to ≤2000 g/mol.

3. The dispersion according to claim 1, wherein the isocyanate-reactive component B) further comprises a polyamine chain extender in an amount of ≥5 weight-% to ≤15 weight-% based on the total weight of the isocyanate-reactive component B).

4. A method for the production of water vapor-permeable coatings comprising applying the aqueous polyurethane dispersion according to claim 1 to a substrate.

5. A method of manufacturing a coated substrate, comprising the steps of providing a substrate and coating the substrate with an aqueous polyurethane dispersion according to claim 1.

6. The method according to claim 5, further comprising the step of drying the aqueous polyurethane dispersion.

7. The method according to claim 5, wherein the substrate is selected from the group consisting of textiles, metal surfaces, glass surfaces, ceramic surfaces, concrete surfaces, stone surfaces, leather surfaces and synthetic polymer surfaces.

8. A coated substrate comprising a coating which comprises an aqueous or dried polyurethane dispersion according to claim 1.

9. The coated substrate according to claim 8, wherein the substrate is selected from the group consisting of textiles, metal surfaces, glass surfaces, ceramic surfaces, concrete surfaces, stone surfaces, leather surfaces and synthetic polymer surfaces.

10. The coated substrate according to claim 8, wherein the coating has a water vapor transmission rate of $\geq 16800$ $g/m^2/d$ to $\leq 22900$ $g/m^2/d$.

11. The dispersion according to claim 1, wherein the polyisocyanate component is dicyclohexylmethane diisocyanate.

12. The dispersion according to claim 3, wherein the polyamine chain extender is ethylenediamine.

13. The dispersion according to claim 1, wherein the polyisocyanate component is dicyclohexylmethane diisocyanate, wherein the isocyanate-reactive component B) further comprises a polyamine chain extender in an amount of $\geq 5$ weight-% to $\leq 15$ weight-% based on the total weight of the isocyanate-reactive component B), and wherein the polyamine chain extender is ethylenediamine.

14. An aqueous polyurethane dispersion consisting of a polyurethane polymer obtained by the reaction of an isocyanate-functional polyurethane prepolymer A) with an isocyanate-reactive component B),
wherein
the isocyanate-functional prepolymer A) is obtained by the reaction of a mixture comprising:
a polyol component comprising a polyester polyol obtained by the reaction of a mixture comprising adipic acid, 1,6-hexanediol and neopentyl glycol, wherein the molar ratio of 1,6 hexane diol to neopentyl glycol is in a range of $\geq 1.5:1$ to $\leq 2.5:1$; and
a polyisocyanate component comprising $\geq 99$ weight-% to $\leq 100$ weight-%, based on the total weight of polyisocyanates, of dicyclohexylmethane diisocyanate;
and wherein the isocyanate-reactive component B) comprises 2-[(2-aminoethyl)amino]ethanesulfonic acid and/or salts thereof, in an amount of $\geq 3.5$ weight-% to $\leq 6$ weight-%, based on the total weight of the polyol component, the polyisocyanate component and the isocyanate-reactive component B),
and wherein the dispersion applied as a coating exhibits a water vapor transmission rate of $\geq 10000$ $g/m^2/d$ to $\leq 25000$ $g/m^2/d$.

\* \* \* \* \*